Sept. 21, 1954   W. F. HARRIS   2,689,905
LIQUID HEATER

Filed April 2, 1953   2 Sheets-Sheet 1

INVENTOR.
WILLIS F. HARRIS
BY
Corbett, Mahoney & Miller
ATTORNEYS

Sept. 21, 1954    W. F. HARRIS    2,689,905
LIQUID HEATER

Filed April 2, 1953    2 Sheets-Sheet 2

*INVENTOR.*
WILLIS F. HARRIS
BY
Corbett, Mahoney + Miller
ATTORNEYS

UNITED STATES PATENT OFFICE 2,689,905

LIQUID HEATER

Willis F. Harris, Newark, Ohio

Application April 2, 1953, Serial No. 346,499

2 Claims. (Cl. 219—38)

My invention relates to a liquid heater. It has to do, more specifically, with an electrically heated tank which is particularly useful for heating water.

Most tank water heaters, especially of the domestic type, are vertically disposed and have the inlet for cold water at a low point and the outlet for the heated water at a high point. In this type of heater, the cold water has a tendency to rise directly up through the tank to the hot water outlet which, obviously, interferes with proper efficient operation of the heater.

It is the main object of my invention to provide a tank-type liquid heater which is more efficient than prior art heaters in that the cold liquid entering the tank is prevented from passing directly to the tank outlet.

According to my invention, the tank is horizontally disposed and is heated by means of immersion type electric heating elements. The tank is provided with an inlet at its lower side and with an outlet at its upper side, the immersion heating elements being disposed at a level intermediate the inlet and outlet. Between the heating elements and the inlet is a horizontal baffle which serves to prevent the cold liquid, entering at the inlet, from rising directly to the outlet, and instead directs it around the immersion heaters before passing towards the outlet.

The preferred embodiment of my invention is illustrated in the accompanying drawing wherein similar characters of reference designate corresponding parts and wherein.

Figure 1:
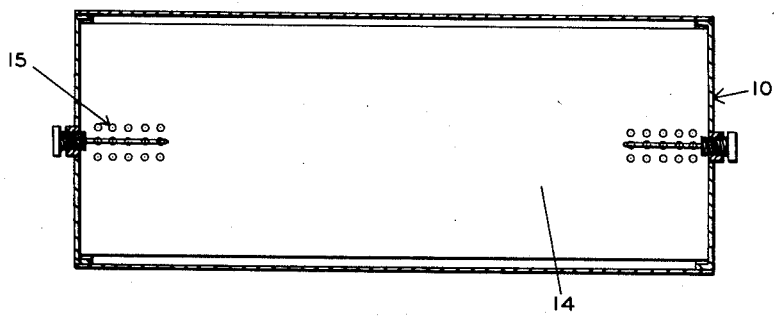
Figure 1 is a horizontal sectional view taken longitudinally through the tank along line 1—1 of Figure 3.

With reference to the drawings, the tank 10 is shown, for illustration, as being of cylindrical form. It may be made of aluminum, steel, iron, galvanized material or other suitable material. It is horizontally disposed. I will describe it as being a water heater but it can be used for heating other liquids.

The tank 10 is provided with an inlet 11 for water to be heated and an outlet 12 for the heated water. The inlet 11 and the outlet 12 are disposed at the lower and upper sides of the tank 10, respectively, intermediate the ends of the tank, preferably at the midpoint of the length thereof. At the flat ends of the tank at the centers thereof, the electric heating elements 13 are mounted. These heating elements are of the immersion type and extend inwardly into the tank towards each other.

The heating elements 13 are at the axis of the tank. Below the axis but spaced above the lower side of the tank is a horizontal baffle plate 14. This plate 14 may be of copper, zinc, steel, iron, galvanized material or any other suitable material. The baffle plate 14 extends the full length of the tank and the full width thereof at the level where it is disposed and its edges may be welded or otherwise sealed to the tank wall.

Figure 2:
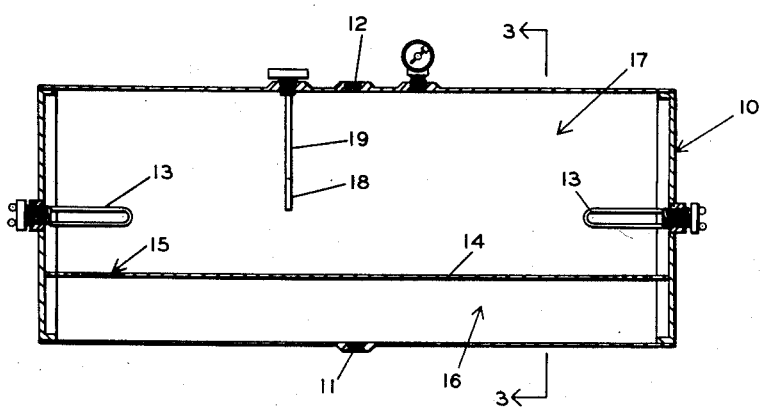
Figure 2 is a vertical sectional view taken longitudinally through the tank.
Figure 3:
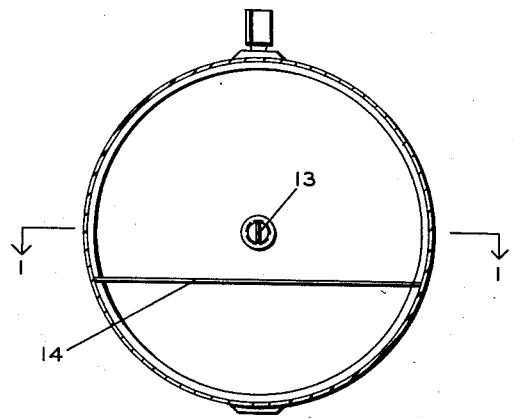
Figure 3 is a transverse sectional view taken along the line 3—3 of Figure 2.

As shown in Figures 1 and 2, directly below each heating element 13, the baffle is provided with a set 15 of small openings. Thus, the baffle 14 will serve to provide a lower chamber 16 into which the cold water is supplied and an upper chamber 17 where the water is heated. The cold water, entering through inlet 11, will not flow directly to outlet 12, but must flow in opposite directions towards the ends of chamber 16 and then upwardly through openings 15 into direct association with the heating elements 13. Also, some heat will be conducted through baffle plate 14 from the hot water in chamber 17 to the colder water in chamber 16 which will serve to preheat the water before it reaches the heating elements 14.

Figure 4:
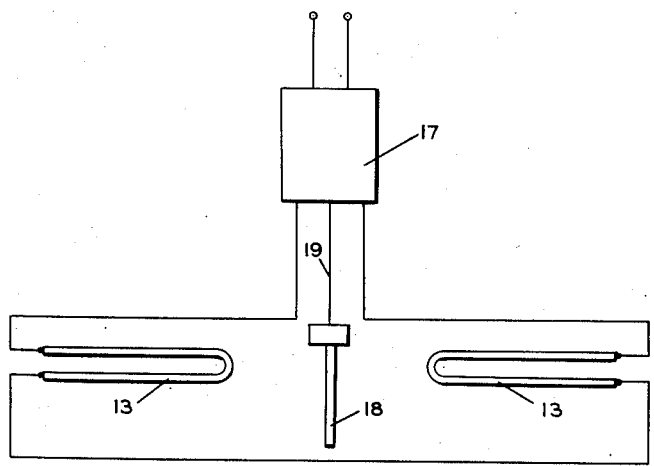
Figure 4 is a wiring diagram of the electric circuit for the heating elements.

The heating elements 13 are connected in series as shown in Figure 4. They are controlled by means of a thermostat control unit 17 of a suitable type which is controlled by a thermobulb unit 18. As shown in Figure 2, the bulb 18 is preferably mounted intermediate the ends of the tank in chamber 17 between the two heating elements 13 and at substantially the same level. It is connected to the unit 17 by means of a capillary tube 19. The water in the upper chamber 17 will be kept uniformly heated by the elements 13 and associated controls and the controls are preferably such that the heating elements will be actuated when the temperature of the water in chamber 17 drops a few degrees, for example 4° F., rather than through a substantial range, for example 25° F., as with most heaters. However, incoming cold water will not cause a sudden drop in temperature of the water in chamber 17 because of the provision of the baffle 14. This baffle also decreases the amount of water that must be heated directly by the elements 13.

It will be apparent that my tank heater has a number of advantages, some of which have been discussed and others of which will be apparent.

Having thus described my invention, what I claim is:

1. A liquid heater comprising a horizontally disposed tank of cylindrical form having an inlet at its lower side and an outlet at its upper side, a horizontally disposed baffle located below the axis of the tank and extending the full length and the full width thereof to divide the tank into upper and lower chambers, a pair of electric heating elements of the immersion type for heating the upper chamber disposed at the axis of the tank and extending inwardly from the ends thereof, said baffle being provided with openings at the ends thereof directly below said heating elements to permit passage of the liquid from the lower chamber into the upper chamber.

2. A liquid heater according to claim 1 wherein the heating elements are controlled by a thermobulb disposed in said upper chamber intermediate said heating elements and adjacent said outlet.

References Cited in the file of this patent

UNITED STATES PATENTS

| Number | Name | Date |
|---|---|---|
| 1,047,389 | Cooper | Dec. 17, 1912 |
| 1,069,679 | De Wallace | Aug. 12, 1913 |
| 1,717,207 | Halle | June 11, 1929 |